(12) United States Patent  
Ushiyama et al.

(10) Patent No.: US 10,717,296 B2  
(45) Date of Patent: Jul. 21, 2020

(54) PRINTING APPARATUS AND PRINTING METHOD

(71) Applicant: CANON KABUSHIKI KAISHA, Tokyo (JP)

(72) Inventors: Takayuki Ushiyama, Chiba (JP); Keita Ishimi, Yokohama (JP); Rie Takekoshi, Kawasaki (JP); Tatsuo Shimmoto, Tokyo (JP); Masaya Uetsuki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/135,594

(22) Filed: Sep. 19, 2018

(65) Prior Publication Data

US 2019/0092038 A1 Mar. 28, 2019

(30) Foreign Application Priority Data

Sep. 25, 2017 (JP) .................................. 2017-183523

(51) Int. Cl.  
*B41J 2/21* (2006.01)  
*C09D 11/322* (2014.01)  
(Continued)

(52) U.S. Cl.  
CPC .......... *B41J 2/2114* (2013.01); *B41J 11/0015* (2013.01); *C09D 11/322* (2013.01); (Continued)

(58) Field of Classification Search  
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045; B41M 5/0011; B41M 5/0017;  
(Continued)

(56) References Cited

U.S. PATENT DOCUMENTS 6,283,589 B1 * 9/2001 Gelbart ............... B41J 11/0015  
347/100  
2005/0243121 A1 * 11/2005 Onishi .................. B41J 2/2114  
347/21

(Continued)

FOREIGN PATENT DOCUMENTS

JP 2005-220352 A 8/2005

OTHER PUBLICATIONS

Japan Tappi Paper Pulp Test Method No. 51: 2000, Paper and board—Determination of the liquid absorbability—Bristow's method.

*Primary Examiner* — Manish S Shah  
(74) *Attorney, Agent, or Firm* — Canon U.S.A., Inc. IP Division

(57) ABSTRACT

A printing apparatus applies liquids so that a reaction liquid and a clear emulsion liquid are mainly applied in a first scanning stage; a coloring material liquid is mainly applied in an intermediate scanning stage; and the clear emulsion liquid is mainly applied in a last scanning stage.

24 Claims, 8 Drawing Sheets

(51) Int. Cl.
*B41J 11/00* (2006.01)
*G06K 15/10* (2006.01)
*C09D 11/40* (2014.01)
*C09D 11/54* (2014.01)
*C09D 11/38* (2014.01)

(52) U.S. Cl.
CPC .............. *C09D 11/38* (2013.01); *C09D 11/40* (2013.01); *C09D 11/54* (2013.01); *G06K 15/107* (2013.01); *B41J 11/002* (2013.01)

(58) Field of Classification Search
CPC .... B41M 5/0047; B41M 7/00; B41M 7/0072; B41M 5/52; B41M 5/5218; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52
See application file for complete search history.

(56) References Cited

U.S. PATENT DOCUMENTS

| | | | |
|---|---|---|---|
| 2008/0248196 A1* | 10/2008 | Anderson | B41M 7/0045 427/203 |
| 2010/0194838 A1* | 8/2010 | Mitsuzawa | B41J 2/2114 347/102 |
| 2012/0287211 A1* | 11/2012 | Sano | B41J 3/407 347/100 |
| 2013/0250002 A1* | 9/2013 | Nishimura | B41J 2/1433 347/45 |
| 2014/0192112 A1* | 7/2014 | Nagashima | B41J 2/01 347/21 |

* cited by examiner

PRINTING APPARATUS AND PRINTING METHOD

BACKGROUND OF THE INVENTION

Field of the Invention

The present disclosure relates to a printing apparatus and a printing method.

Description of the Related Art

There has been known a printing apparatus operable to print an image on a printing medium by ejecting liquid (i.e. ink) from a printing head onto the printing medium. This type of printing apparatus has been increasingly used to produce printed articles for various applications, and various types of ink are used accordingly.

Japanese Patent Laid-Open No. 2005-220352 discloses a method for fixing an image on a printing medium by using an ink containing a coloring material and a polymer emulsion. In this method, the ink dropped on the printing medium is heated so that the polymer emulsion forms a coating film on the surface of the printing medium, thereby fixing the image. According to this prior art document, the coating film formed by heating the polymer emulsion enhances the fastness of the printed image.

In the printing apparatus operable to eject ink for printing, however, when ink droplets applied onto a printing medium come into contact, they attract each other and cause bleeding into each other, degrading image quality. To reduce this disadvantage, a reaction liquid reactive with the coloring material in the ink is used in some cases. By bringing the reaction liquid into contact with the ink on the printing medium, the coloring material in the ink is caused to flocculate, thus reducing the attraction between ink droplets.

The present inventors however found that it may be difficult for the ink containing a coloring material and a polymer emulsion as disclosed in the above-cited prior art document to produce satisfactory image quality.

SUMMARY OF THE INVENTION

Accordingly, the present disclosure provides a printing apparatus and a printing method that can reduce bleeding and decrease in fastness in the case of using a liquid containing a coloring material, a clear emulsion liquid, and a reaction liquid.

According to an aspect of the present disclosure, there is provided a printing apparatus including an applying unit capable of applying a first liquid, a second liquid, and a third liquid onto a printing medium. The first liquid contains a coloring material. The second liquid contains a polymer emulsion but no coloring material. The third liquid contains a reactive component reactive with the first liquid but contains no coloring material. The printing apparatus also includes a controlling unit capable of controlling the applying unit, wherein the applying unit applies the liquids to a predetermined region of the printing medium by applying operations performed in the following order: a first applying operation of applying the second liquid and the third liquid each in a larger amount than the first liquid; a second applying operation of applying the first liquid in a larger amount than each of the second liquid and the third liquid; and a third applying operation of applying the second liquid in a larger amount than each of the first liquid and the third liquid.

Further features of the present disclosure will become apparent from the following description of exemplary embodiments with reference to the attached drawings.

DESCRIPTION OF THE EMBODIMENTS

Figure 1:
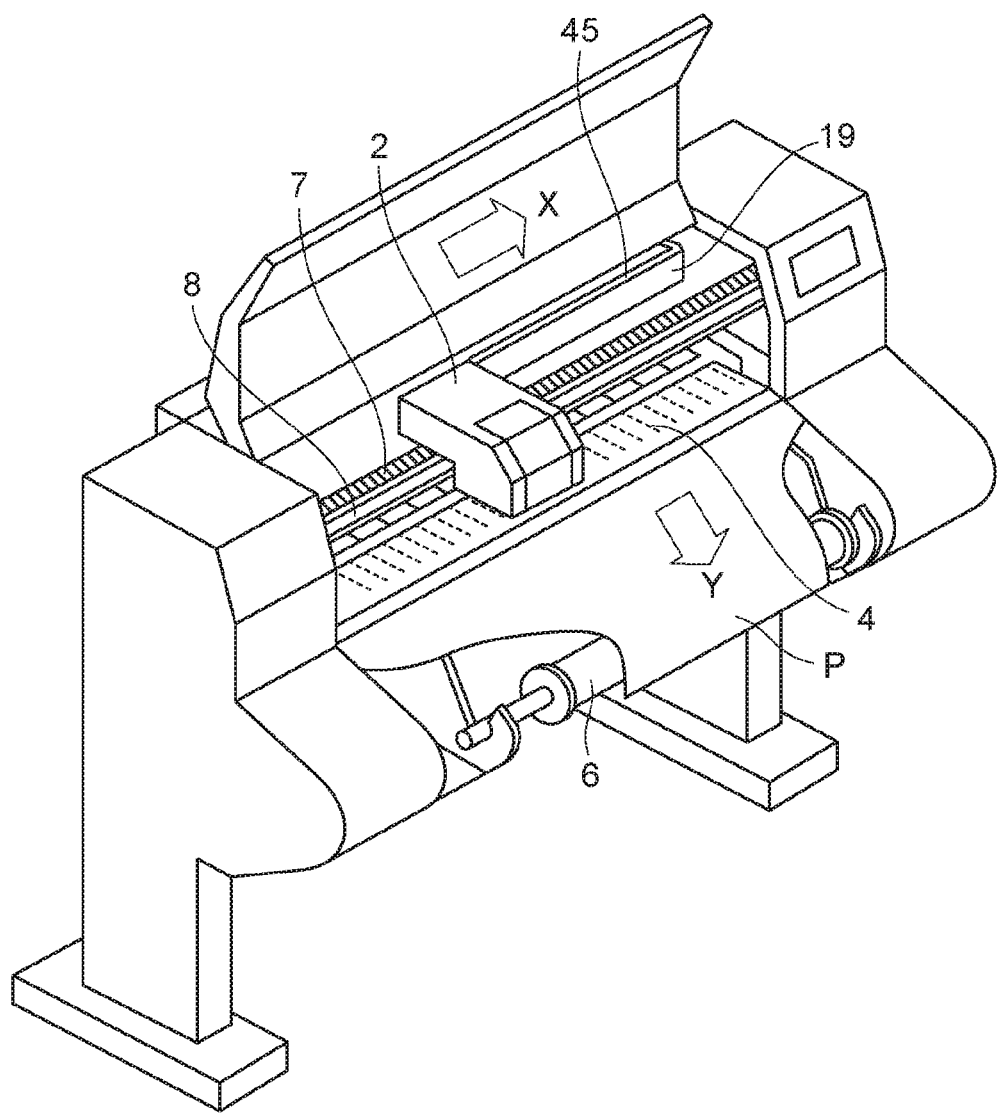
FIG. 1 is a perspective view of a printing apparatus according to an embodiment of the present disclosure.

Degradation of image quality caused when a liquid containing a coloring material (i.e. ink) and a liquid containing a polymer emulsion is used will first be described.

First, the solids content in the ink of this type can increase. Unlike ordinary inks containing only a coloring material, the ink disclosed in Japanese Patent Laid-Open No. 2005-220352 contains a polymer emulsion with a relatively large proportion. Accordingly, the content of solids (particles of coloring material and polymer emulsion) in one droplet of the ink on the printing medium increases. This can cause clogging of ejection nozzles. Although clogging can be reduced by increasing the diameter of the ejection nozzles to increase the amount of ink to be ejected through each nozzle, this increases the diameter of each ink droplet and results in a reduced definition and a reduced glossiness.

In addition, unnecessary application of the polymer emulsion may interfere with the formation of high-quality images. For producing a printed article for outdoor display, an ink containing a coloring material and a polymer emulsion may be used. In this instance, the ink is heated so that the polymer emulsion forms a coating film, thus producing a printed article resistant to water and rubbing. The polymer emulsion-containing ink is also used for producing printed articles intended for indoor display as well for outdoor display. However, application of the polymer emulsion often results in a reduced glossiness. The inventors worry that use of an ink containing a polymer emulsion contrarily reduce the glossiness of printed articles.

To suppress to some extent the degradation of image quality resulting from the phenomenon just described, the coloring material and the polymer emulsion may be used separately in respective inks.

However, if a reaction liquid reactive with a coloring material is used when an ink containing a coloring material (coloring material ink) and an ink containing a polymer emulsion (clear emulsion ink) are separately prepared, bleeding may not be satisfactorily suppressed or the rub fastness of the resulting image may be reduced, depending on the application order of the coloring material ink, the clear emulsion ink, and the reaction liquid.

For example, if the order of the three types of liquid or the positions of application of the liquids are not specified, a large number of droplets of the coloring material ink may be applied close to each other and hardly come into contact with the reaction liquid in some cases. In such cases, the reaction liquid is not likely to function effectively to flocculate the coloring material, and hence, bleeding occurs in spite of using the reaction liquid.

This disadvantage can be solved by first applying the reaction liquid and subsequently applying the coloring material ink. Thus, the coloring material ink is applied to the region where the reaction liquid has been applied. Consequently, the coloring material comes into contact with the reaction liquid that has previously been applied even though a large number of droplets of the coloring material are applied close to each other. Then, the clear emulsion ink is applied after the coloring material ink has been applied and is then formed into a coating film of the polymer emulsion over the surface of an image by heating. Consequently, the image has a durable surface.

In this instance, however, the clear emulsion ink is not applied until the reaction liquid and the coloring material ink have been applied; hence being applied at the third stage for the first time. Thus, almost all the polymer emulsion remains on the surface of the image but is not present at the interface between the surface of the printing medium and the image. Thus, the surface of the image is covered with the coating film of the polymer emulsion, exhibiting high durability, while the binding force of the polymer emulsion between the surface of the printing medium and the image is reduced with a reduced fastness between them.

The present disclosure provides a solution to this issue, and some embodiments will be now described with reference to the drawings.

First Embodiment

FIG. 1 depicts the appearance of an ink jet printing apparatus (hereinafter also referred to as the printing apparatus or the printer) according to an embodiment of the present disclosure. This printing apparatus is what is called a serial scan printer, which prints an image on a printing medium P by applying an ink onto the printing medium P being conveyed in a direction Y (conveying direction) from a printing head traversing (scanning) in a direction X (scanning direction) perpendicular to the direction Y.

The structure of this ink jet printing apparatus and the operation thereof during printing will now be roughly described with reference to FIG. 1. First, a printing medium P is conveyed in the Y direction from a spool 6 holding the printing medium P by a conveying roller driven with a gear by a conveying motor (not shown). A carriage unit is reciprocally moved to travers (scan) the printing medium P along a guide shaft 8 extending in the X direction by a carriage motor (not shown). The printing apparatus causes a printing head (described herein later) mountable on the carriage unit 2 to eject an ink through ejection nozzles at a timing based on a positional signal converted by an encoder 7, thus printing a band having a predetermined width corresponding to the arrangement of the ejection nozzles. In the present embodiment, the carriage unit 2 traverses at a scanning speed of 40 inches per second, and the printing head ejects the ink at a resolution of 600 dpi (1/600 inches). Then, the printing medium P is conveyed and printed in the next band with the predetermined width. The carriage unit 2 may traverse at a scanning speed of more than 40 inches per second.

The driving force from the carriage motor to the carriage unit 2 may be transmitted by a carriage belt. As an alternative to the carriage belt, a mechanism may be used which includes, for example, a leadscrew extending in the X direction and rotatable by the carriage motor, and an engaging member provided for the carriage unit 2 and engaged with the groove of the leadscrew.

The printing medium P is conveyed, with being pinched between a feed roller and a pinch roller, to a printing position (region that the printing head scans) on a platen 4. Normally, in a quiescent state, the face of the printing head is provided with a cap. The cap is removed before starting printing so that the printing head or the carriage unit 2 can scan. Then, on storing data of one scanning operation in a buffer, the carriage motor drives the carriage unit 2 for scanning. Printing is thus performed.

The printing apparatus also includes a heating device (not shown) operable to heat a clear emulsion ink (described herein later) to form a coating film. The heating device may be disposed over the printing head so as to heat the underlying printing medium on which an image has been printed. Alternatively, the heater may be disposed under the platen 4 so as to heat the overlying printing medium on which an image has been printed.

The printing apparatus of the present embodiment performs printing in such a manner that an image is printed in a predetermined region (1/n band) of the printing medium P by a plurality of times (n times) of scanning of the printing head. This is what is called multi-pass printing. The multi-pass printing technique will be described in detail herein later.

Figure 2:
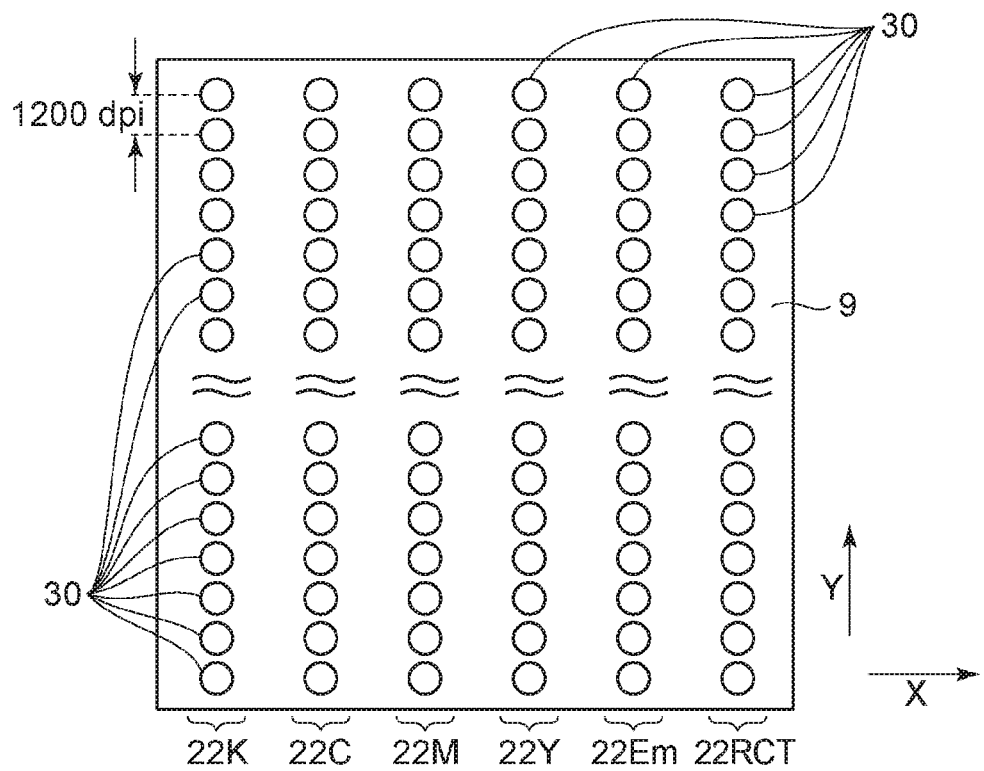
FIG. 2 is a schematic view of a printing head used in an embodiment of the present disclosure.

FIG. 2 depicts a printing head 9 of the printing apparatus according to the present embodiment. The printing head 9 has an array 22K of ejection nozzles 30 through which a black ink (K) is ejected, an array 22C of ejection nozzles 30 through which a cyan ink (C) is ejected, an array 22M of ejection nozzles 30 through which a magenta ink (M) is ejected, and an array 22Y of ejection nozzles 30 through which a yellow ink (Y) is ejected. The black ink (K), the cyan ink (C), the magenta ink (M), and the yellow ink (Y) each contain a coloring material. Such an ink may be hereinafter referred to as a coloring material ink.

Also, the printing head 9 has an array 22RCT of ejection nozzles 30 through which a reaction liquid (RCT) containing no coloring material is ejected. The reaction liquid contains a reactive component reactive with the coloring material contained in the coloring material inks but contains no coloring material. The reaction liquid will be brought into contact with any of the coloring material ink on the printing medium, thus suppressing bleeding.

The printing head 9 farther has an array 22Em of ejection nozzles 30 through which a clear emulsion ink (Em) is ejected. The clear emulsion ink contains a polymer emulsion but no coloring material. The clear emulsion ink is heated after being applied onto the printing medium to form a coating film acting to improve at least one of the rub fastness, water resistance, and light fastness of the printed image.

In the printing head 9, the ejection nozzle arrays 22K, 22C, 22M, 22Y, 22Em, and 22RCT are arranged in this order in the X direction from left to right. Each of the ejection nozzle arrays 22K, 22C, 22M, 22Y, 22Em, and 22RCT has 1280 ejection nozzles 30 aligned in the Y direction (aligning direction) with a density of 1200 dpi. In the present embodiment, the amount of ink ejected at one time through one ejection nozzle 30 is about 4.5 pL.

Each of the ejection nozzle arrays 22K, 22C, 22M, 22Y, 22Em, and 22RCT communicates with a corresponding ink tank (not shown) that stores the corresponding ink, and the ink is fed from the ink tank. The printing head 9 and the ink tank may be integrated into one body or may be separable.

The compositions of the black ink (K), the cyan ink (C), the magenta ink (M), the yellow ink (Y), the clear emulsion ink (Em), and the reaction liquid (RCT) will be described herein later.

Figure 3:
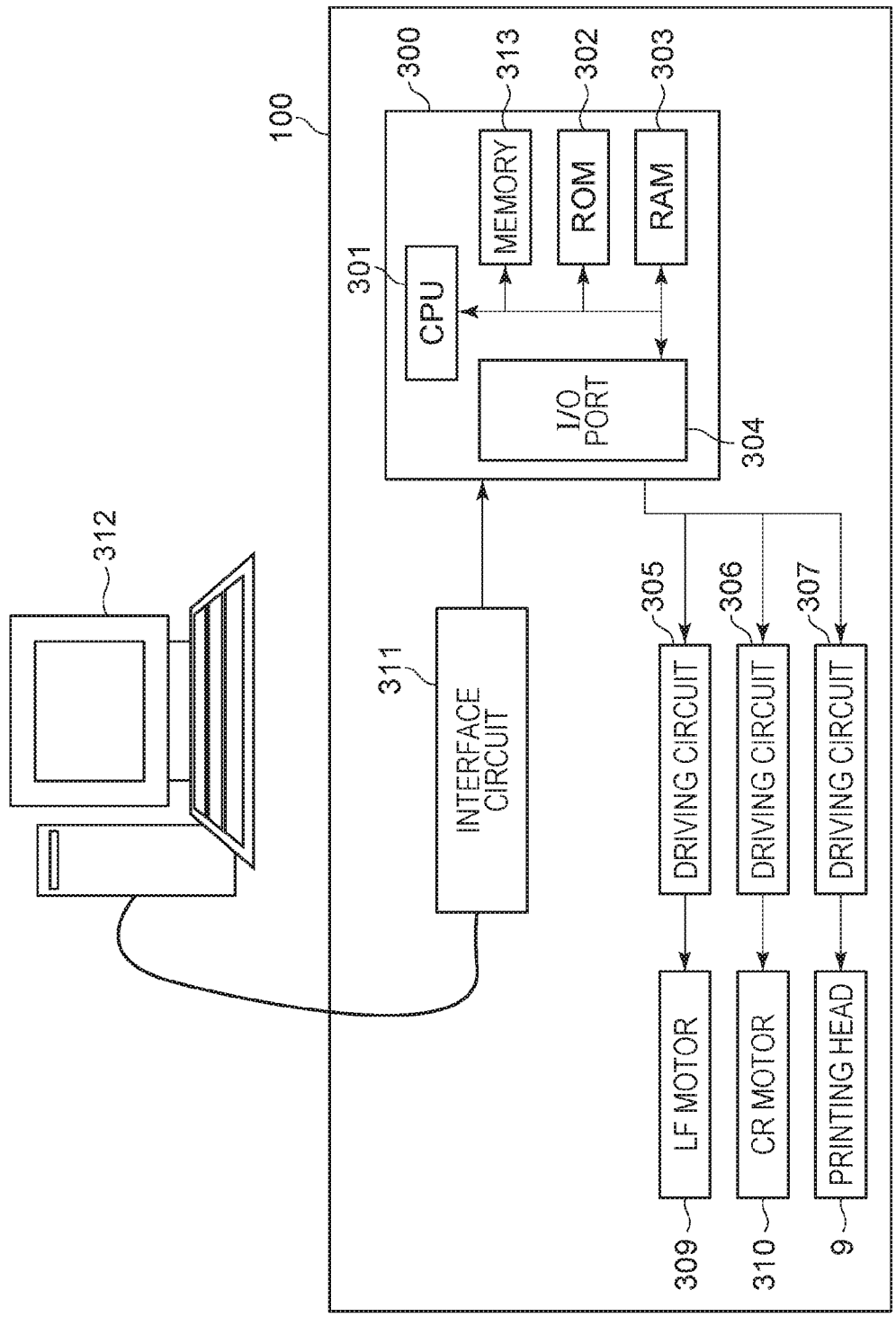
FIG. 3 is a block diagram of the structure of a printing control system according to an embodiment of the present disclosure.

FIG. 3 is a block diagram schematically illustrating the structure of a printing control system in a printing apparatus 100 according to the present embodiment. A main control section 300 includes a CPU 301 operable to execute processing operation, such as arithmetic calculation, selection, discrimination, and control, and printing operation; a ROM 302 storing a control program and the like to be executed by the CPU 301; a RAM 303 used as a buffer or the like of printing data, and an input/output port 304. A memory device 313 stores mask patterns or the like that will be described herein later. The input/output port 304 is connected to a conveying motor (LF motor) 309, a carriage motor (CR motor) 310, a printing head 9, and driving circuits 305, 306, and 307 including an actuator of a disconnection unit. The main control section 300 is connected to a PC 312 acting as a host computer via an interface circuit 311.

Data Processing

Figure 4:
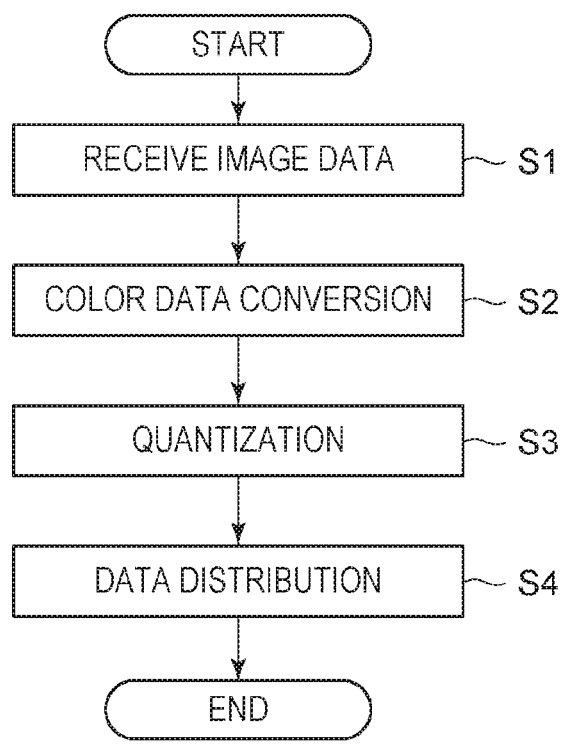
FIG. 4 is a flow chart of a data processing process used in an embodiment of the present disclosure.

Turning now to FIG. 4, this is a flow chart of printing data generation executed by the CPU 301 according to the control program used in the present embodiment.

First, in step S1, the CPU 301 receives image data (brightness data) of each color of red (R), green (G), and blue (13) represented by 8 bits (256 values of 0 to 255) inputted to the printing apparatus 100 from the host computer, or PC 312.

Subsequently, in step S2, the R, G, and B image data are converted to multivalued data of a plurality of inks (K, C, M, Y, Em, and RCT). This color conversion processing generates multivalued data represented by 8 bits, 256 values (0 to 255) defining the tone of each of the inks K, C, M, Y, Em, and RCT.

Subsequently, in step S3, the multivalued data of K, C, M, Y, Em, and RCT are quantized to generate quantized data (binary data) represented by 1 bit (2 values of 0 and 1) determining whether or not the inks K, C, M, Y, Em, and RCT are each ejected (applied). This quantization may be executed in accordance with a variety of method, such as error diffusion, dithering, or an index method.

Then, in step S4, the quantized data are distributed to a plurality of times of scanning operation performed on a predetermined region by the printing head. Through this data distribution are generated printing data that are represented by 1 bit (2 values of 0 and 1) and that determine whether or not each of the inks K, C, M, Y, Em, and RCT is ejected to the corresponding pixels in each scanning operation for the predetermined region of the printing medium. The data distribution is executed by using mask patterns corresponding to the plurality of times of scanning and determining whether or not each pixel permits the corresponding ink ejection.

In the present embodiment, the inks are ejected according to the printing data thus generated.

Although in the present embodiment, the CPU 301 in the printing apparatus 100 executes all the steps S1 to S4, other embodiments may be implemented. For example, in an embodiment, all the steps S1 to S4 may be executed in the PC 312. In another embodiment, some of the steps may be executed in the PC 312, and the rest of the steps may be executed in the printing apparatus 100.

Multi-Pass Printing

In the present embodiment, an image is printed by what is call a multi-pass printing technique that is performed by applying the inks K, C, M, Y, Em, and RCT to a predetermined region of the printing medium by a plurality of times of scanning operation. A typical multi-pass printing technique will now be described below.

Figure 5:
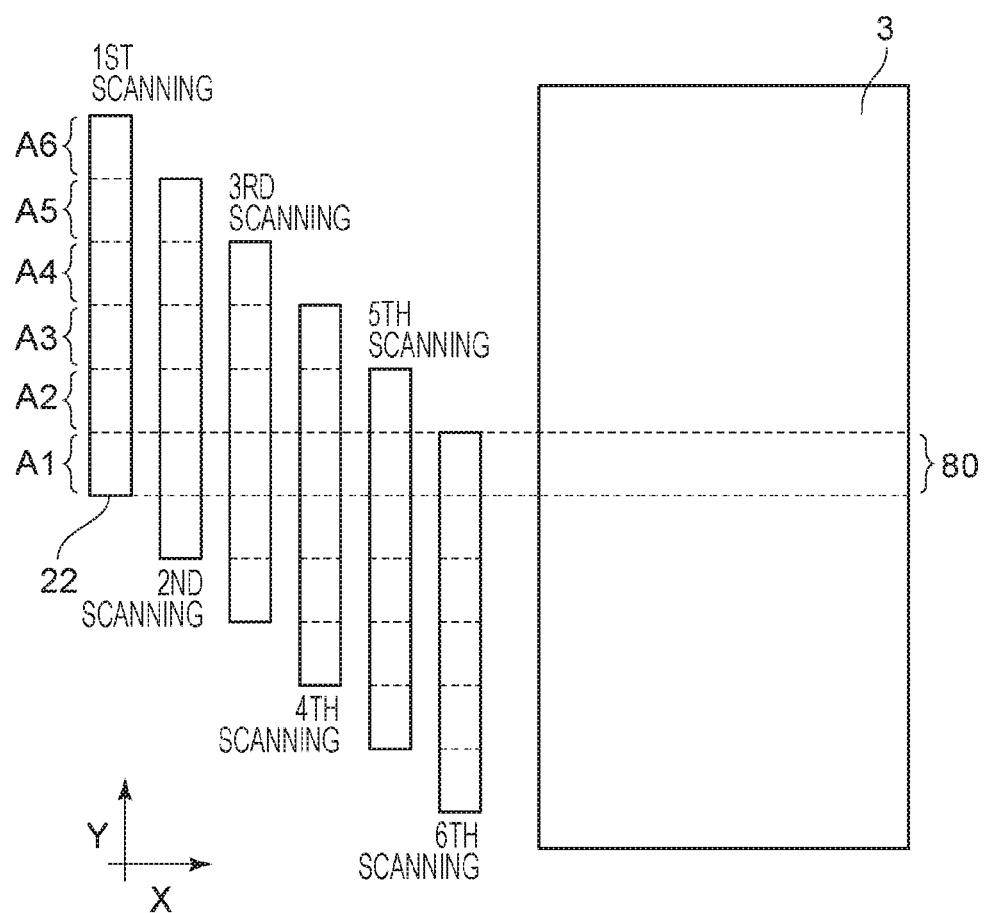
FIG. 5 is a representation of general multi-pass printing.

FIG. 5 is a representation of a typical multi-pass printing method. In this method, each array 22 of the ejection nozzles is divided in the Y direction into six groups A1 to A6 of ejection nozzles, and the inks are ejected through the ejection nozzles of each group in each of six times of scanning for the predetermined region. Although in the actual printing, the printing medium 3 is conveyed in the Y direction every time of scanning of the printing head 9, FIG. 5 illustrates for simplification as if the printing head 9 moves in the direction opposite to the Y direction.

In the first scanning, the printing head 9 moves in a state where group A1 of the ejection nozzle arrays 22 corresponds to a predetermined region 80 on the printing medium 3, and each ink is ejected onto the predetermined region 80 through the ejection nozzles in group A1 according to the printing data for the first scanning generated in step S4. After the first scanning is completed, the printing medium P is conveyed a distance corresponding to the one ejection nozzle group in the Y direction. Then, in the second scanning, each ink is ejected onto the predetermined region 80 through the ejection nozzles in group A2. Subsequently, the ink is ejected in the third to the sixth scanning through the ejection nozzles in the respective groups A3 to A6 onto the predetermined region 80 by alternations between the conveyance of the printing medium and the ink ejection from the printing head. Thus, multi-pass printing for the predetermined region 80 is completed.

Figure 6:
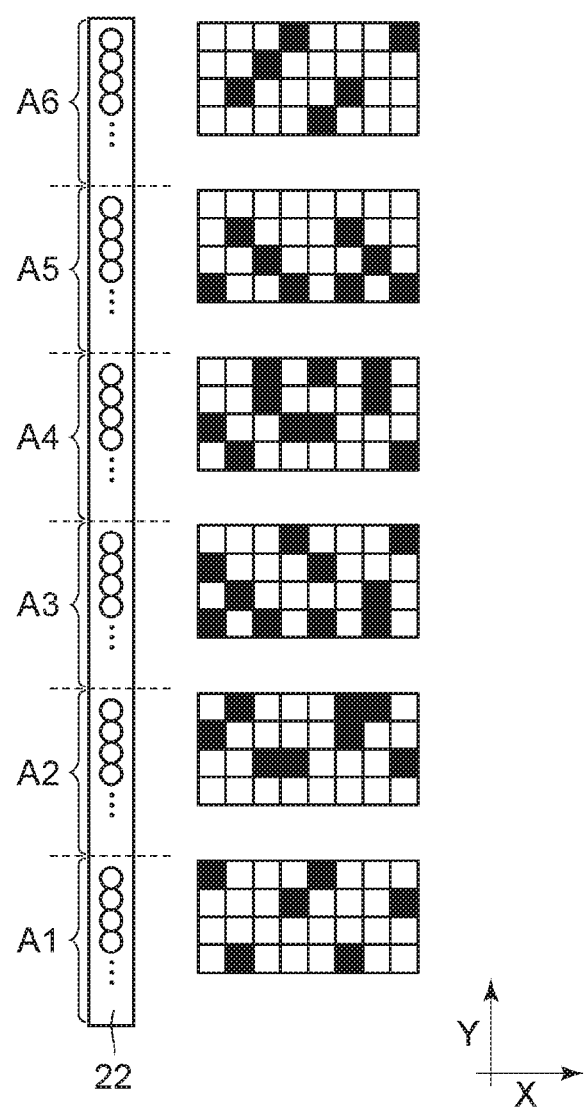
FIG. 6 is an illustrative representation of typical mask patterns.

FIG. 6 is an illustrative representation of typical mask patterns. In the patterns shown in FIG. 6, the black solid portions represent pixels that permits the ejection of ink determined by the quantized data (hereinafter referred to as print permitting pixels), and the white blank portions represent pixels that do not accept ejection of ink even though the ejection is determined by the quantized data (hereinafter referred to as non-print permitting pixels). The mask patterns shown in FIG. 6 each have a size corresponding to 4 pixels×8 pixels. By repeatedly using these mask patterns in the X and the Y direction, all the quantized data for each predetermined region are distributed.

The 6 mask patterns shown in FIG. 6 each have 32 pixels (4 pixels×8 pixels), and the total number of the print permitting pixels in the 6 mask patterns is 48 pixels. The print permitting percentage, that is, the percentage of the total number of print permitting pixels in the patterns shown in FIG. 6 to the number of pixels of one mask pattern is 150% (=48/32×100).

For the mask pattern for each time of scanning, the mask pattern for the first scanning (using ejection nozzle group A1) and the mask pattern for the sixth scanning (using ejection nozzle group A6) each have 6 print permitting pixels. Hence, the print permitting percentages of the mask patterns for the first and the sixth scanning are each about 20% (=6/32×100).

The mask pattern for the second scanning (using ejection nozzle group A2) and the mask pattern for the fifth scanning (using ejection nozzle group A5) each have 8 print permitting pixels. Hence, the print permitting percentages of the mask patterns for the second and the fifth scanning are each about 25% (=8/32×100).

The mask pattern for the third scanning (using ejection nozzle group A3) and the mask pattern for the fourth scanning (using ejection nozzle group A4) each have 10 print permitting pixels. Hence, the print permitting percentages of the mask patterns for the third and the fourth scanning are each about 30% (=10/32×100).

Thus, when mask patterns as shown in FIG. 6 are used, the amount of ink ejected in each of the third and the fourth scanning is the largest of the six times (first to sixth) of scanning operation, and the amount of ink ejected in each of the first and the sixth scanning is the smallest of the six times.

Compositions of Inks

The compositions of the inks according to the present embodiment will now be described. In the following description, "part(s)" and "%" are on a mass basis unless otherwise specified.

1. Compositional Conditions of Inks

The inks of the present of embodiment are adjusted so that the acid dissociation constant pKa of the reactive component in the reaction liquid RCT is lower than the pKa of the water-soluble resin in each of the coloring material inks C, M, Y, and K and higher than the pKa of the water-soluble resin in the polymer emulsion Em.

An acid dissociation constant pKa is a quantitative measure of the strength of an acid and is represented by using a negative common logarithm for the hydrogen-releasing dissociation reaction of the acid. In general, the lower the pKa, the stronger the acid.

In the present embodiment, it is beneficial that the reactive component in the reaction liquid has such an acid strength as to keep the particles of the polymer emulsion dispersed in the clear emulsion ink and destroy the dispersion of the pigment (coloring material) in pigment inks (coloring material inks).

In the present embodiment, the polymer emulsion and the pigments are each dispersed with a resin. More specifically, a water-soluble resin having an anionic group is attached to the surfaces of the particles of the pigments and polymer emulsion. In such states, the three pKa of the anionic group of the water-soluble resin attached to the pigment, the anionic group of the water-soluble resin attached to the polymer emulsion, and the reactive component are adjusted as described below. In the description below, the pKa of the anionic group of the water-soluble resin attached to the pigment is represented as PigpKa; the pKa of the anionic group of the water-soluble resin attached to the polymer emulsion is represented as EmpKa; and the pKa of the reactive component is represented as AcpKa.

In the present embodiment, it is beneficial that the pigment in each pigment ink is allowed to react with the reactive component in the reaction liquid from the viewpoint of reducing bleeding. Accordingly, a substance having a higher acid strength than the anionic group of the water-soluble resin attached to the pigment is used as the reactive component. Hence, PigpKa>AcpKa holds true.

Also, it is beneficial that the reactive component has a lower acid strength than the anionic group of the water-soluble resin attached to the polymerulsion so that the polymer emulsion does not react with the reactive component, from the viewpoint of preventing the polymer emulsion from interfering with the full reaction of the pigment with the reactive component. Hence, AcpKa>EmpKa holds true.

Thus, it is beneficial that the inks used in the present embodiment satisfy the relationship: PigpKa>AcpKa>EmpKa. When these inks satisfying this relationship come into contact with each other, the pigment is likely to precipitate and the polymer emulsion is not likely to precipitate.

Accordingly, in the present embodiment, an appropriate combination of the reactive component and each of the anionic groups of the water-soluble resins of the pigment and the polymer emulsion is selected.

Details will now be described. For example, glutaric acid is used as the reactive component. Glutaric acid has a pKa of about 4.3. If a dispersion contains a sulfonate ($-SO_3$), the sulfonate is less reactive with the reactive component or glutaric acid because sulfonic acid has a pKa of about 3.0. Thus, the polymer emulsion used in the present embodiment is in a state of dispersion containing a sulfonate so that the polymer emulsion is less reactive with the reaction liquid.

If a dispersion contains a carboxylate ($-COO$), the carboxylate is reactive with glutaric acid because acetic acid has a pKa of about 4.8. Accordingly, in the present embodiment, the pigment is in a state of dispersion containing a carboxylate from the viewpoint of enhancing the reactivity with the reaction liquid.

If the pigment and the polymer emulsion contain plural types of anionic groups, EmpKa and PigpKa can be determined by the anionic group mainly involved in the dispersion. For example, if a polymer emulsion dispersed with a mixture of a sulfonate and a carboxylate does not flocculate when mixed with an organic acid having a pKa of about 4.0, it can be thought that the sulfonate is mainly involved in the dispersion.

2. Compositions of Inks

The compositions of the inks will be described in detail below.

The pigment inks (C, M, Y, and K), the reaction liquid (RCT), and the clear emulsion ink (Em) each contain a water-soluble organic solvent. The water-soluble organic solvent may have a boiling point in the range of 150° C. to 300° C. in view of how much the face of the printing head 9 can be wetted and kept wet. Also, in view of the function of helping polymer fine particles to form a coating film and of the swelling and dissolution of the printing medium coated with the polymer coating film, the water-soluble organic solvent may be selected from among ketones, such as acetone and cyclohexanone; propylene glycol derivatives, such as tetraethylene glycol dimethyl ether; and heterocyclic compounds having a lactam structure, such as N-methylpyrrolidone and 2-pyrrolidone. The content of the water-soluble organic solvent may be in the range of 3% by weight to 30% by weight from the view of easy ejection. Examples of the water-soluble organic solvent include alkyl alcohols having a carbon number of 1 to 4, such as methyl alcohol, ethyl alcohol, n-propyl alcohol, isopropyl alcohol, n-butyl alcohol, sec-butyl alcohol, and tert-butyl alcohol; amides, such as dimethylformamide and dimethylacetamide; ketones or hydroxy ketones, such as acetone and diacetone alcohol; ethers, such as tetrahydrofuran and dioxane; polyalkylene glycols, such as polyethylene glycol and polypropylene glycol; ethylene glycol or alkylene glycols whose alkylene group has a carbon number of 2 to 6, such as propylene glycol, butylene glycol, triethylene glycol, 1,2,6-hexanetriol, thiodiglycol, hexylene glycol, and diethylene glycol; lower alkyl ether acetates, such as polyethylene glycol monomethyl acetate; glycerin; lower alkyl ethers of polyhydric alcohols, such as ethylene glycol monomethyl (or monoethyl) ether, diethylene glycol methyl (or ethyl) ether, and triethylene glycol monomethyl (or monoethyl) ether; polyhydric alcohols, such as trimethylolpropane and trimethylolethane; and N-methyl-2-pyrrolidone, 2-pyrrolidone, and 1,3-dimethyl-2-imidazolidinone. One of these water-soluble organic solvents may be used singly, or a mixture of two or more of these organic solvents may be used. Water may be deionized water. The water-soluble organic solvent content in the reaction liquid (RCT) is not particularly limited. The pigment inks (C, M, Y, and K) and the clear emulsion ink (Em) may optionally contain a surfactant, an antifoaming agent, a preservative, a fungicide, and the like in addition to necessary components from the viewpoint of imparting a desired physical property.

In the present embodiment, each of the pigment inks (C, M, Y, and K), the reaction liquid (RCT), and the clear emulsion ink (Em) contains a surfactant. The surfactant is intended to act as a penetration agent to help the ink penetrate ink jet printing media. As the surfactant content is increased, the surface tension of the ink decreases, and, accordingly, the ink can more easily wet and penetrate the printing medium. In the present embodiment, a small amount of acetylene glycol EO adduct or the like is added as the surfactant into each ink to adjust the surface tension of the ink to 30 dyn/cm or less with a difference of 2 dyn/cm or less from the surface tension of the other inks. More specifically, the surface tension of each ink is adjusted to about 28 dyn/cm to about 30 dyn/cm. For measuring the surface tension, an automatic surface tensiometer CBVP-Z (manufactured by Kyowa Interface Science) may be used. Any other instrument may be used provided that it can measure the surface tension of the inks.

Each of the inks of the present embodiment is stably alkaline and has a pH of 8.5 to 9.5. From the viewpoint of preventing the components or members of the printing apparatus and the printing head that will come in contact with the inks from dissolving in or being damaged by the inks, and preventing decrease in solubility of the resin involved in dispersion in the ink, pH of each ink may be in the range of 7.0 to 10.0. The pH may be measured with a pH meter model F-52 manufactured by Horiba. Any other instrument may be used provided that it can measure the pH of the inks.

2-1. Pigment Inks

For simplicity in description, only the cyan (C) and magenta (M) inks of the pigment inks (black (K), cyan (C), magenta (M), and yellow (Y)) used in the present embodiment will be described.

2-1-1. Magenta Ink
Preparation of Dispersion Liquid

First, an AB block copolymer having an acid value of 300 and a number average molecular weight of 2500 is produced from benzyl acrylate and methacrylic acid in a conventional process. Then, the reaction system is neutralized with an aqueous solution of potassium hydroxide and diluted with ion-exchanged water to yield a 50% by mass homogeneous aqueous solution of the polymer.

Then, 100 g of the polymer solution is mixed with 100 g of C. I. Pigment Red 122 and 300 g of ion-exchanged water, and the mixture is mechanically stirred for 0.5 hour.

Subsequently, the resulting mixture is passed through the interaction chamber of a microfluidizer five times at a liquid pressure of about 70 MPa.

The dispersion liquid thus prepared is centrifuged (at 12,000 rpm for 20 minutes), and undispersed components including course particles are removed. Thus, a magenta dispersion liquid is prepared. The magenta dispersion liquid contains 10% by mass of the pigment and 5% by mass of dispersant.

Preparation of Ink

For preparing a magenta ink, the magenta dispersion liquid is mixed with the following ingredients to a desired concentration. After sufficiently mixing the ingredients with stirring, the mixture is subjected to pressure filtration through a microfilter of 2.5 μm in pore size (produced by Fujifilm Corporation) to yield a pigment ink containing 4% by mass of the pigment and 2% by mass of the dispersant.

Magenta dispersion liquid prepared above: 40 parts
2-Pyrrolidone: 5 parts
2-Methyl-1,3-propanediol: 15 parts
Acetylene glycol EO adduct: 0.5 part (produced by Kawaken Fine Chemicals)
Ion-exchanged water: balance 2-1-2. Cyan Ink
Preparation of Dispersion Liquid First, an AB block copolymer having an acid value of 250 and a number average molecular weight of 3000 is produced from benzyl acrylate and methacrylic acid in a conventional process. Then, the reaction system is neutralized with an aqueous solution of potassium hydroxide and diluted with ion-exchanged water to yield a 50% by mass homogeneous aqueous solution of the polymer.

Then, 180 g of the polymer solution is mixed with 100 g of C. I. Pigment Blue 15:3 and 220 g of ion-exchanged water, and the mixture is mechanically stirred for 0.5 hour.

Subsequently, the resulting mixture is passed through the interaction chamber of a microfluidizer five times at a liquid pressure of about 70 MPa.

The dispersion liquid thus prepared is centrifuged (at 12,000 rpm for 20 minutes), and undispersed components including course particles are removed, thus, a cyan dispersion liquid is prepared. The cyan dispersion liquid contains 10% by mass of the pigment and 10% by mass of dispersant.

Preparation of Ink

For preparing a cyan ink, the cyan dispersion liquid is mixed with the following ingredients to a desired concentration. After sufficiently mixing the ingredients with stirring, the mixture is subjected to pressure filtration through a microfilter of 2.5 μm in pore size (produced by Fujifilm Corporation) to yield a pigment ink containing 4% by mass of the pigment and 2% by mass of the dispersant.

Cyan dispersion liquid: 20 parts
2-Pyrrolidone: 5 parts
2-Methyl-1,3-propanediol: 15 parts
Acetylene glycol EO adduct: 0.5 part (produced by Kawaken Fine Chemicals)
Ion-exchanged water: balance 2-2. Reaction Liquid The reaction liquid used in the present embodiment contains a reactive component that can react with the pigment in each ink to flocculate or gel the pigment. More specifically, when the reaction liquid is mixed with an ink containing a pigment stably dispersed or dissolved in a water-soluble medium by the function of an ionic group, the reactive component destroys the stable dispersion of the pigment. In the present embodiment, glutaric acid is used as the reactive component, as described above.

However, the reactive component is not necessarily glutaric acid, and, in another embodiment, any other water-soluble organic acid may be used. Examples of such an organic acid include oxalic acid, polyacrylic acid, formic acid, acetic acid, propionic acid, glycolic acid, malonic acid, malic acid, maleic acid, ascorbic acid, levulinic acid, succinic acid, glutaric acid, glutamic acid, fumaric acid, citric acid, tartaric acid, lactic acid, pyrrolidonecarboxylic acid, pyronecarboxylic acid, pyrrolecarboxylic acid, furancarboxylic acid, pyridinecarboxylic acid, coumalic acid, thiophenecarboxylic acid, nicotinic acid, oxysuccinic acid, and dioxysuccinic acid. The organic acid content may be in the range of 3.0% by mass to 90.0% by mass, beneficially in the range of 5.0% by mass to 70.0% by mass, relative to the total mass of the reaction liquid.

Preparation of Ink

In the present embodiment, glutaric acid (for example, produced by Wako Pure Chemical Industries) is used as the organic acid, or reactive component, and the following ingredients are mixed together to yield a reaction liquid:
Glutaric acid: 3 parts
2-Pyrrolidone: 5 parts
2-Methyl-1,3-propanediol: 15 parts
Acetylene glycol EO adduct: 0.5 part (produced by Kawaken Fine Chemicals)
Ion-exchanged water: balance 2-3. Clear Emulsion Ink The clear emulsion ink used in the present embodiment contains a polymer emulsion, but does not contain any coloring material.

The term "polymer emulsion" mentioned herein refers to polymer fine particles dispersed in water. Examples of such polymer fine particles include acrylic resin fine particles synthesized by emulsion polymerization of at least one monomer such as alkyl (meth)acrylate ester or (meth)acrylic acid alkylamide, styrene-acrylic resin fine particles synthesized by emulsion polymerization of an alkyl (meth)acrylate ester or a (meth)acrylic acid alkylamide with a styrene monomer, polyethylene resin fine particles, polypropylene resin fine particles, polyurethane resin fine particles, and styrene-butadiene resin fine particles. Other types of polymer fine particles may also be used such as core-shell polymer fine particles each including a core and a shell that are made of polymers having different compositions, or polymer fine particles produced by emulsion polymerization using acrylic resin fine particles synthesized as seeds in advance for controlling the particle size. Also, hybrid polymer fine particles may be used which are produced by chemically combining different types of resin fine particles, for example, combining acrylic resin fine particles and urethane resin fine particles.

The "polymer fine particles dispersed in water", or polymer emulsion, may be in a state of fine particles produced by homopolymerization or copolymerization of one or more monomers having a dissociable group, that is, in a state of dispersion of self-dispersible polymer fine particles. The dissociable group in this instance may be a sulfo group, as described above. The monomers having a dissociable group may be acrylic acid, methacrylic acid, or the like. The "polymer fine particles dispersed in water" may be what is called an emulsifier-dispersed polymer fine particle dispersion prepared by dispersing polymer fine particles with an emulsifier. The emulsifier may be a substance having an anionic charge, irrespective of whether it has a low molecular weight or a high molecular weight.

The dissociable group is not necessarily the sulfo group provided that AcpKa>EmpKa holds true. For example, the dissociable group may be the phosphate group.

Any polymer containing a sulfo group, including generally used natural or synthetic polymers and a novel polymer developed for the clear emulsion ink, may be used as the polymer component of the polymer fine particles without particular limitation. From the viewpoint of general use and easy design of the function of the polymer fine particles, a homopolymer or a copolymer of one or more monomers having a radically polymerizable unsaturated bond, similar to acrylic resin or styrene-acrylic resin may be used.

Exemplary sulfo-containing monomers having a hydrophilic radically polymerizable unsaturated bond include styrenesulfonic acid, sulfonic acid-2-propylacrylamide, acrylic acid-2-ethyl sulfonate, methacrylic acid-2-ethyl sulfonate, butylacrylamide sulfonic acid, and salts thereof.

The sulfo-containing hydrophilic radically polymerizable unsaturated monomer may be used in combination with any other hydrophilic monomer. Examples of such a hydrophilic monomer include monomers having a carboxy group, such as acrylic acid, methacrylic acid, crotonic acid, ethacrylic acid, propylacrylic acid, isopropylacrylic acid, itaconic acid, and thmaric acid, and salts thereof; and monomers having a phosphonate group, such as methacrylic acid 2-ehyl phosphonate and acrylic acid 2-ethyl phosphonate.

Hydrophobic monomers may be used, and examples thereof include (meth)acrylic acid esters, such as methyl acrylate, ethyl acrylate, isopropyl acrylate, n-propyl acrylate, n-butyl acrylate, t-butyl acrylate, benzyl acrylate, methyl methacrylate, ethyl methacrylate, isopropyl methacrylate, n-propyl methacrylate, n-butyl methacrylate, isobutyl methacrylate, t-butyl methacrylate, tridecyl methacrylate, and benzyl methacrylate; styrene-based monomers, such as styrene, α-methylstyrene, o-methylstyrene, m-methylstyrene, p-methylstyrene, and p-tert-butylstyrene; itaconic acid esters, such as benzyl itaconate; maleic acid esters, such as dimethyl maleate; fumaric acid esters, such as dimethyl fumarate; and acrylonitrile and vinyl acetate. Known or novel oligomers or macrornonomers may be used without particular limitation.

The radically polymerizable monomer used in the present embodiment, which is to be subjected to aqueous precipitation polymerization to form polymer fine particles having a sulfo group, is selected according to the desired properties of the polymer fine particles. In the present embodiment, the radically polymerizable monomer may be a known monomer or a novel monomer developed for the clear emulsion ink of the present embodiment.

In the present embodiment, the polymer of the polymer fine particles having a sulfa group may be a copolymer of monomers including at least one of the above-cited hydrophilic monomers having a sulfo group and at least one of the above-cited hydrophobic monomers. This is beneficial in terms of providing inks in a good dispersion state and capable of producing high-quality printed articles. For producing the polymer fine particles, desired properties of the polymer fine particles can be controlled by appropriately selecting some factors, such as the polymerization initiator to be used and the content thereof and the monomers forming the copolymer and the proportions thereof.

Although the radial polymerization is performed under conditions appropriately selected depending on the natures of the polymerization initiator, the dispersant, and the monomers, the reaction temperature may be 100° C. or less, for examples, in the range of 40° C. to 80° C. The reaction time may be 1 hour or more, for example, in the range of 6 hours to 30 hours. The stirring speed during the reaction may be in the range of 50 rpm to 500 rpm, for example, in the range of 150 rpm to 400 rpm.

For forming polymer fine particles having a sulfo group by polymerization of at least one hydrophobic monomer and at least one hydrophilic monomer having a sulfo group, the monomers may be dropped in an aqueous dispersion containing an aqueous radical polymerization initiator. When polymer fine particles containing a sulfo group are formed from a mixture of monomers having different natures such as the mixture of the hydrophobic monomer and the hydrophilic monomer, it is beneficial to keep the proportions of the monomers constant from the viewpoint of uniformly producing the polymer fine particles, if a mixture of such monomers is added to a polymerization system in a much larger amount than the amount of monomers that will be consumed in a certain period for the polymerization, the polymerization tends to proceed in such a manner that only a specific monomer is polymerized and consumed in advance, followed by polymerization of the rest of the monomers. In this instance, the resulting sulfo group-containing polymer fine particles have nonuniform properties.

In the case of a polymer component containing a hydrophilic monomer component with a high content, the polymer may not be able to precipitate due to the high hydrophilicity thereof, thus remaining as a water-soluble component in the reaction system without forming sulfo group-containing polymer fine particles. The polymer fine particles may be synthesized by a known process.

In the present embodiment, first, the aqueous dispersion is prepared by dispersing insoluble polymer fine particles in water with a water-soluble resin acting as a dispersant. The polymer fine particles prepared in this process, which have a sulfo group, can be stably dispersed. The preparation of the clear emulsion ink will now be described in detail.

Preparation of Ink

The dispersion of the polymer fine particles is prepared as below.

First, 28.5 parts of methyl methacrylate as a hydrophobic monomer and a mixture of 4.3 parts of hydrophilic monomer sodium p-styrenesulfonate and 30 parts of water are gradually dropped into a mixture of 0.05 part of potassium persulfate as a polymerization initiator and 30 parts of water, and a polymerization reaction is performed for 5 hours with stirring with a motor at 70° C. in a nitrogen atmosphere.

The resulting polymer fine particles are mixed with the following ingredients so that the polymer content would be 10% in the resulting ink, and the mixture is subjected to pressure filtration through a microfilter of 2.5 µm in pore size (produced by Fujifilm Corporation) to yield a clear emulsion ink.

2-Pyrrolidone: 5 parts
2-Methyl-1,3-propanediol: 15 parts
Acetylene glycol EO adduct: 0.5 part (produced by Kawaken Fine Chemicals)
Ion-exchanged water: balance Printing Medium The printing apparatus according to the present embodiment can print poorly permeable printing media into which water does not easily permeate.

Exemplary poorly permeable printing media include printing media having a plastic uppermost layer over a substrate, printing media having no ink-receiving layer, and sheets, films and banners made of glass, YUPO, or plastics. The plastics applied to the printing media include polyvinyl chloride, polyethylene terephthalate, polycarbonate, polystyrene, polyurethane, polyethylene, and polypropylene. Poorly permeable printing media are resistant to water, light and abrasion and are therefore used, in general, for printed articles for outdoor display.

The permeability of printing media may be measured by Bristow's Method specified in Standard No. 51 of JAPAN TAPPI, "Test Method for Liquid Absorption of Paper and Paperboard" (in Japanese). In the Bristow's method, a predetermined amount of an ink is poured into a container having an aperture slit having a predetermined size, and is then brought into contact through the aperture with a printing medium formed into a rectangular shape and wound around a disk. Thus, the ink is transferred onto the printing medium to form an ink band, and the area (or length) of this ink band is measured. From the measured area of the ink band, the amount per unit area ($mL \cdot m^{-2}$) of ink transferred for one second is calculated. In the present embodiment, when the amount of ink transferred (amount of ink absorption) for 30 $msec^{1/2}$ measured by Bristow's method is lower than 10 $mL \cdot m^{-2}$, the printing medium is considered to be poorly permeable.

Printing Control

In the present embodiment, printing is completed by the following three applying operations performed in the following order with six times of scanning operation for a predetermined region.

First applying operation (the first and the second scanning):
 applying the reaction liquid and the clear emulsion ink but no pigment ink.
Second applying operation (the third and the fourth scanning)
 applying the pigment inks but no reaction liquid nor clear emulsion ink.
Third applying operation (the fifth and the sixth scanning)
 applying the clear emulsion ink but no pigment ink nor reaction liquid.

In the first applying operation, the reaction liquid is first applied before the pigment ink is applied. This enables the pigment inks to flocculate immediately after being applied in the second operation, thus suppressing bleeding.

In the first applying operation, the clear emulsion ink is also applied together with the reaction liquid. Thus, the polymer emulsion is allowed to remain between the surface of the printing medium and the image even after image formation is completed, enhancing the fastness of the printed article.

In the second applying operation, only the pigment inks are applied. At this time, since the reaction liquid has already been applied onto the surface of the printing medium by the first applying operation, the applied pigment inks start flocculating immediately. Thus, bleeding of the pigment inks is reduced.

In the third applying operation, only the clear emulsion ink is applied. Thus, the coating film of the clear emulsion ink coats the surface of the image formed of the pigment inks to enhance the durability of the printed article.

In the present embodiment, in order to apply the inks by the above-described applying operations in the above-described order, different sets of mask patterns are applied to quantized data corresponding to each of the reaction ink, the pigment inks, and the clear emulsion ink.

Figure 7A:
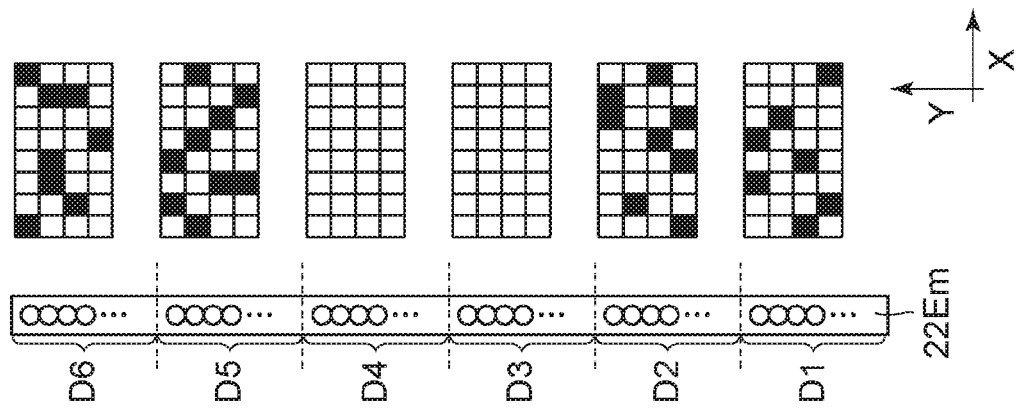
FIGS. 7A to 7C are each an illustrative representation of mask patterns used in an embodiment of the present disclosure.
Figure 7B:
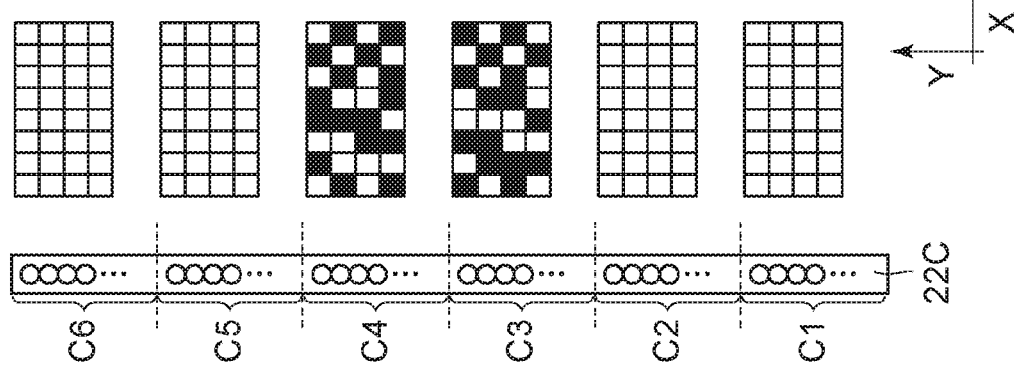
Figure 7C:
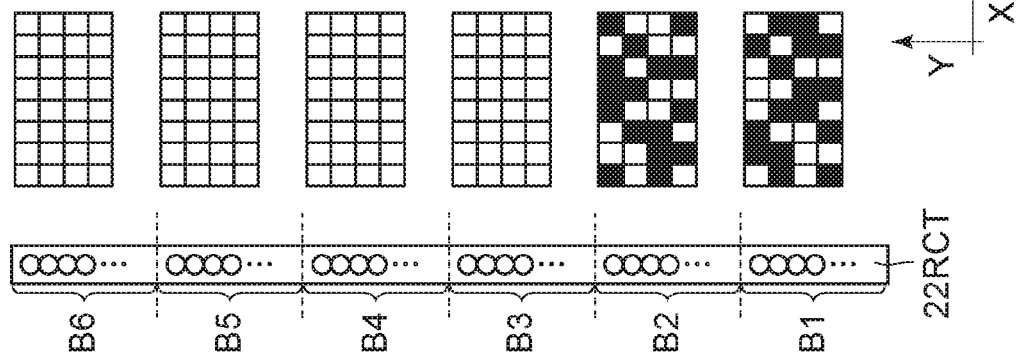

FIGS. 7A to 7C are illustrative representations of mask patterns used in the present embodiment. FIGS. 7A, 7B, and 7C depict mask patterns for the array 22RCT of ejection nozzles for the reaction liquid, the array 22C of ejection nozzles for the cyan ink, the array 22Em of ejection nozzles for the clear emulsion ink, respectively. FIG. 7B depicts the mask patterns applied to the quantized data for the cyan ink as a set of mask patterns applied to the quantized data for the pigment inks. The sets of mask patterns for the other pigment inks, that is, the magenta, the yellow ink, and the black ink, are set in the same manner.

In the six mask patterns shown in FIG. 7A, print permitting pixels lie at positions exclusive and complementary to each other. Accordingly, if quantized data for the reaction liquid are input so that the reaction liquid is applied to 50% of the pixels, the printing data for the first to the sixth scanning generated with the mask patterns shown in FIG. 7A are to be set such that the reaction liquid is ejected to 50% of the pixels in total. Hence, the density of the reaction liquid is stored before and after the distribution. The same applies to the six mask patterns for the cyan ink shown in FIG. 7B and the six mask patterns for the clear emulsion ink shown in FIG. 7C.

As shown in FIG. 7A, among the mask patterns for the ejection nozzle groups B1 to B6 of the reaction liquid ejection nozzle array 22RCT for the first to the sixth scanning, only the mask patterns for the ejection nozzle groups B1 and B2 for the first scanning stage (the first and the second scanning) have print permitting pixels. On the other hand, the mask patterns for the ejection nozzle groups B3 and B4 for the intermediate scanning stage (the third and the fourth scanning) and the ejection nozzle groups B5 and B6 for the last scanning stage (the fifth and the sixth scanning) do not have any print permitting pixels. Thus, the reaction liquid is ejected only in the first and the second of the six times of scanning.

For the ejection nozzle array 22C for the cyan ink, among the mask patterns for the ejection nozzle groups C1 to C6 for the first to the sixth scanning, the mask patterns for ejection nozzle groups C3 and C4 for the intermediate scanning stage (the third and the fourth scanning) have print permitting pixels, as shown in FIG. 7B. On the other hand, the mask patterns for the ejection nozzle groups C1 and C2 for the first scanning stage (the first and the second scanning) and the ejection nozzle groups C5 and C6 for the last scanning stage (the fifth and the sixth scanning) do not have any print permitting pixels. Thus, the cyan ink is ejected only in the third and the fourth of the six times of scanning.

For the ejection nozzle array 22Em for the clear emulsion ink, among the mask patterns for the ejection nozzle groups D1 to D6 for the first to the sixth scanning, the mask patterns for ejection nozzle groups D1 and D2 for the first scanning stage (the first and the second scanning) and ejection nozzle groups D5 and D6 for the last scanning stage (the fifth and the sixth scanning) have print permitting pixels. The mask patterns for other ejection nozzle groups D3 and D4 for the intermediate scanning stage (the third and fourth scanning) do not have any print permitting pixels. Thus, the clear emulsion ink is ejected in the first, the second, the fifth, and the sixth of the six times of scanning.

As just described, in the present embodiment, the reaction liquid and the clear emulsion ink are ejected in the first several times of scanning (first scanning stage); then, the pigment inks (cyan ink, magenta ink, yellow ink, and black ink) are ejected in the next several times of scanning (intermediate scanning stage); and the clear emulsion ink is ejected in the last several times of scanning (last scanning stage).

More specifically, first, the reaction liquid and the clear emulsion ink are ejected in the first and the second scanning. In the third and the fourth scanning, only the pigment inks are ejected. Finally, in the fifth and the sixth scanning, only the clear emulsion ink is ejected.

Thus, the inks are ejected in the order described above.

According to the present embodiment, bleeding and decrease in fastness can be suppressed in the printing system using the reaction liquid, the pigment inks, and the clear emulsion ink.

Second Embodiment

In the first embodiment, the pigment inks are not ejected in the first scanning stage (the first and the second scanning); the reaction liquid and the clear emulsion ink are not ejected in the intermediate scanning stage (the third and the fourth scanning); and the reaction ink and the pigment inks are not ejected in the last scanning stage (the fifth and the sixth scanning).

In contrast, in the second present embodiment, the ink(s) that is/are not ejected in a scanning stage in the first embodiment is/are ejected to some extent in that scanning stage. For example, the pigment inks are ejected in the first scanning stage (the first and the second scanning) and the last scanning stage (the fifth and the sixth scanning), as well as in the intermediate scanning stage (the third and the fourth scanning). In this instance, however, the amount of each pigment ink to be ejected is set so as to be smaller than the amounts of the other inks. In the first and the second scanning, the pigment inks may be ejected, but the amount thereof is smaller than the amounts of the reaction liquid and the clear emulsion ink.

In the following description, the same description as in the first embodiment will be omitted.

Figure 8A:
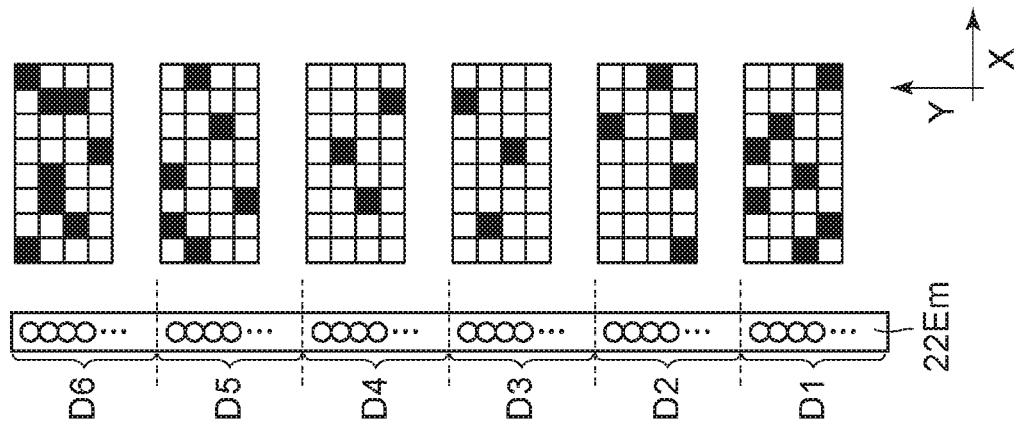
FIGS. 8A to 8C are each an illustrative representation of mask patterns used in an embodiment of the present disclosure.
Figure 8B:
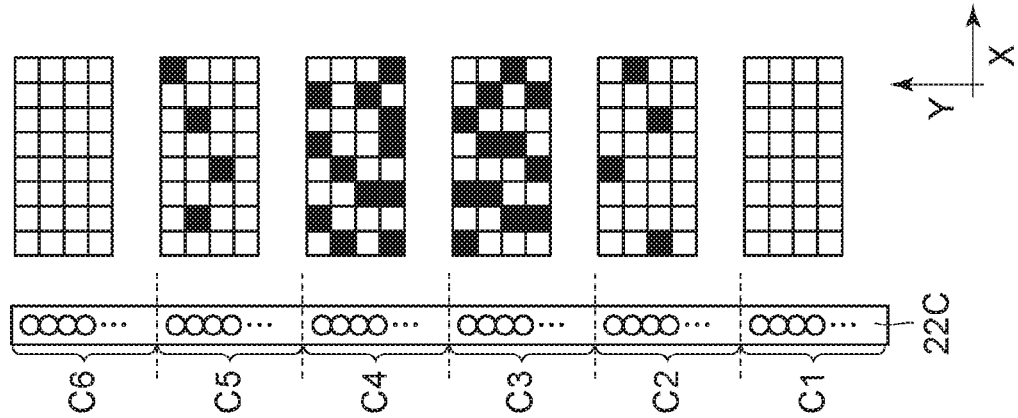
Figure 8C:
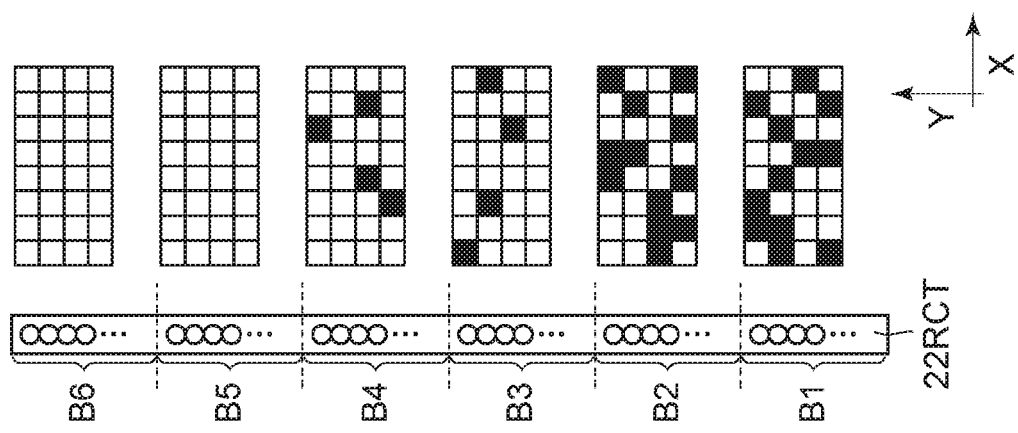

FIGS. 8A to 8C are illustrative representations of mask patterns used in the present embodiment. FIGS. 8A, 8B, and 8C depict mask patterns for the array 22RCT of ejection nozzles for the reaction liquid, the array 22C of ejection nozzles for the cyan ink, the array 22Em of ejection nozzles for the clear emulsion ink, respectively. FIG. 8B depicts the mask patterns applied to the quantized data for the cyan ink as a set of mask patterns applied to the quantized data for the pigment inks. The sets of mask patterns for the other pigment inks, that is, the magenta, the yellow ink, and the black ink, are set in the same manner.

In the present embodiment, as shown in FIG. 8A, the mask patterns of the ejection nozzle array 22RCT for the reaction liquid not only for the first scanning stage (the first and the second scanning) but also for the intermediate scanning stage (the third and the fourth scanning) have print permitting pixels. However, the number of print permitting pixels in this instance for the intermediate scanning stage is smaller than the number of print permitting pixels in the mask patterns of the cyan ink ejection nozzle array 22C for the intermediate scanning stage (the third and the fourth scanning) shown in FIG. 8B. Hence, the reaction liquid is ejected in the intermediate scanning stage (the third and the fourth scanning) unlike the first embodiment, but the amount thereof to be ejected in this scanning stage is smaller than that in the first scanning stage (the first and the second scanning).

In addition, as shown in FIG. 8A, the mask patterns of the ejection nozzle array 22C for the cyan ink not only for the intermediate scanning stage (the third and the fourth scanning) but also for the second and the fifth scanning have print permitting pixels. However, the number of print permitting pixels in the mask patterns of the cyan ink ejection nozzle array 22C for the second scanning is smaller than the number of print permitting pixels in the mask patterns of the reaction liquid ejection nozzle array 22RCT for the second scanning shown in FIG. 8A and the number of print permitting pixels in the mask patterns of the clear emulsion ink ejection nozzle array 22Em for the second scanning shown in FIG. 8C. Also, the number of print permitting pixels in the mask patterns of the cyan ink ejection nozzle array 22C for the fifth scanning is smaller than the number of print permitting pixels in the mask patterns of the clear emulsion ink ejection nozzle array 22Em for the fifth scanning shown in FIG. 8C. Hence, the cyan ink is ejected in the second and the fifth scanning unlike the first embodiment, but the amount thereof to be ejected in these scanning operations is smaller than that in the third and the fourth scanning.

In addition, in the present embodiment, the mask patterns of the ejection nozzle array 22Em for the clear emulsion ink not only for the first scanning stage (the first and the second scanning) and the last scanning stage (the fifth and the sixth scanning) but also for the intermediate scanning stage (the third and the fourth scanning) have print permitting pixels, as shown in FIG. 8C. However, the number of print permitting pixels in this instance for the intermediate scanning stage is smaller than the number of print permitting pixels in the mask patterns of the cyan ink ejection nozzle array 22C for the intermediate scanning stage (the third and the fourth scanning) shown in FIG. 8B. Hence, the clear emulsion ink is ejected in the intermediate scanning stage (the third and the fourth scanning) unlike the first embodiment, but the amount thereof to be ejected in this scanning stage is smaller than the amount in the first scanning stage (the first and the second scanning) and the amount in the last scanning stage (the fifth and the sixth scanning).

The use of the above-described mask patterns allows: the reaction liquid and the clear emulsion ink to be mainly ejected in the first scanning stage (the first and the second scanning); the pigment ink to be mainly ejected in the intermediate scanning stage (the third and the fourth scanning), and the clear emulsion ink to be mainly ejected in the last scanning stage (the fifth and the sixth scanning) while allowing each ink to be ejected in other scanning stages. Accordingly, the amount of each ink to be ejected for one scanning operation can be reduced to some extent, thus reducing the degradation of image quality resulting from contact of ink droplets ejected in the same scanning operation. Also, since each ink is ejected in a relatively small amount in the scanning operations other than the scanning operation in which the ink is mainly ejected, the risk of bleeding and decrease in fastness is low.

Other Embodiments

Although in the above-described embodiments, printing for a predetermined region is completed by six times of scanning where the ink to be ejected is different among the first, the intermediate, and the last scanning stage, other embodiments may be implemented. For example, in the case of setting the number of times of scanning for a predetermined region according to user input or image information, if the printing is performed with a small number of times of scanning (for example, three times), each ink may be ejected in different manner from the first embodiment. If the number of times of scanning is as small as 3, the first applying operation, the second applying operation, and the third applying operation are each performed with one scanning operation. In this instance, the amount of ink to be ejected in each scanning operation is excessively increased, increasing the risk of degrading image quality. In such a case, the reaction liquid, the pigment inks, and the clear emulsion ink may be ejected in the same amount in each of the three times of scanning without applying any of the above-described embodiments. This may increase the risk of bleeding and decrease in fastness but can reduce the risk of degrading image quality even though the amount of ink ejected in one scanning operation is increased. If the number of times of scanning is relatively large, for example, 6 times, the inks may be ejected by the above-described applying operations in the above-described order to reduce bleeding and decrease in fastness.

Although the disclosed embodiments illustrate printing on poorly permeable printing media, other embodiments may be implemented. In an embodiment, permeable printing media such as plain paper and glossy paper, as well as poorly permeable printing media, may be printed. In this case, poorly permeable printing media are printed with the reaction liquid, the pigment inks, and the clear emulsion ink by the applying operations performed in the order described in the disclosed embodiments. On the other hand, for printing on permeable printing media, only the pigment inks or only the pigment inks and the reaction liquid are used without using the clear emulsion ink. This is because many of the printed articles produced by printing on permeable printing media such as plain paper or glossy paper are intended for indoor display that is not required to be resistant to water and light and, accordingly, need not be enhanced in fastness by emulsion coating. Printed articles for indoor display are image quality-oriented, and it is accordingly beneficial to minimize unevenness or imperfection of the polymer emulsion coating. Accordingly, the clear emulsion ink may not necessarily be used for printing on permeable printing media. In such cases, when poorly permeable printing media are printed, the same effect as in the disclosed embodiment can be produced by applying the inks by the applying operations performed in the order described in the disclosed embodiments.

Although in the disclosed embodiments, the order of ink application is controlled by scanning a predetermine region a plurality of times in different manners, other embodiments may be implemented. For example, inks may be ejected from a printing head having a plurality of ejection nozzle arrays in which ejection nozzles are arranged in a region having a width larger than the width of the printing medium while the printing medium is being moved in a direction intersecting the width thereof. This can produce the same effect as in the disclosed embodiment even if the number of times of scanning is one. In such cases, the ejection nozzle arrays are arranged in the order of the array for the reaction liquid, the array for the clear emulsion ink, the arrays for the pigment inks, and the array for the clear emulsion ink in the direction from the upstream side toward the downstream side. This arrangement can produce the same effect as in the disclosed embodiments.

In each embodiment, it is beneficial that the pigment inks have a higher surface tension than the reaction liquid and the clear emulsion ink. More specifically, the pigment inks, in each embodiment, have a surface tension in the range of 27 dyn/cm to 30 dyn/cm, and the reaction liquid and the clear emulsion ink each have a surface tension in the range of 20 dyn/cm to 23 dyn/cm. When two liquids having different surface tensions come into contact with each other, in general, one having a higher surface tension attracts the other (Marangoni effect). Therefore, when the surface tensions of the inks are adjusted as above, the pigment inks having a higher surface tension do not move much from the point that have landed on. Thus, bleeding resulting from such ink movement can be reduced. The clear emulsion ink having a lower surface tension moves in such a manner that it flows into droplets of the pigment ink. Thus, the clear emulsion ink is more likely to coat the layer of the pigment ink, further improving the fastness to water, light and rubbing.

Although in the above-described embodiments, the reaction liquid and the clear emulsion ink do not contain a coloring material, these inks may contain a small amount of coloring material in some other embodiments to the extent that printed images are not affected. In the description disclosed herein, the expression "containing no coloring material", "containing substantially no coloring material", and similar expression imply that a small amount of coloring material may be contained to the extent that the printed images are not affected.

Although in the disclosed of embodiments, the idea disclosed herein is implemented in a printing apparatus and a printing method using the printing apparatus, the idea may be implemented in an image processing apparatus or method adapted to generate data used for the disclosed printing method. In an embodiment, the idea may be implemented as a software program for performing the printing method disclosed herein, provided separately for the printing apparatus.

Also, the idea disclosed herein may be implemented effectively in many types of ink jet printing apparatus including thermal jet type and piezoelectric ink jet type.

The printing medium used herein is not limited to a paper medium used in ordinary printing apparatuses, and may be cloth, a plastic film, a metal plate, or a medium of any other material that can receive ink, such as glass, ceramic, wood, or leather.

According to the present embodiment, bleeding and decrease in fastness can be suppressed in the printing system using a coloring material ink, a reaction liquid, and a clear emulsion ink.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-183523, filed Sep. 25, 2017, which is hereby incorporated by reference herein in its entirety.

What is claimed is:

1. A printing apparatus comprising:
an applying unit configured to apply a color liquid, a clear liquid, and a reactive liquid onto a printing medium, the color liquid containing a coloring material, the clear liquid containing a polymer emulsion, the reactive liquid containing a reactive component reactive with the color liquid; and
a controlling unit configured to control the applying unit to selectively apply the liquids to a predetermined region of the printing medium,
wherein, to selectively apply the liquids, the controlling unit causes the applying unit to perform applying operations in the following order:
a first applying operation of applying the clear liquid and the reactive liquid each in a larger amount than the color liquid;
a second applying operation of applying the color liquid in a larger amount than each of the clear liquid and the reactive liquid; and
a third applying operation of applying the clear liquid in a larger amount than each of the color liquid and the reactive liquid.

2. The printing apparatus according to claim 1, wherein, to selectively apply the liquids, the controlling unit causes the applying unit to perform:
the first applying operation without applying the color liquid;
the second applying operation without applying the clear liquid nor the reactive liquid, and
the third applying operation without applying the color liquid nor the reactive liquid.

3. The printing apparatus according to claim 1, further comprising a scanning device,
wherein the applying unit includes a printing head from which the color liquid, the clear liquid, and the reactive liquid are applied, and the scanning device causes the printing head to scan the predetermined region a plurality of times.

4. The printing apparatus according to claim 3, wherein, to selectively apply the liquids, the controlling unit causes the applying unit to perform:
the first applying operation in a first scanning stage of the plurality of times of scanning by applying each of the clear liquid and the reactive liquid to the predetermined region in a larger amount than the color liquid;
the second applying operation in an intermediate scanning stage of the plurality of times of scanning by applying the color liquid to the predetermined region in a larger amount than each of the clear liquid and the reactive liquid, and
the third applying operation in a last scanning stage of the plurality of times of scanning by applying the clear liquid to the predetermined region in a larger amount than each of the color liquid and the reactive liquid.

5. The printing apparatus according to claim 3, wherein when the controlling unit causes the applying unit to apply the liquids to the predetermined region with a first number of times of scanning, the liquids are applied by performing the first applying operation, the second applying operation, and the third applying operation in this order, and
wherein when the controlling unit causes the applying unit to apply the liquids to the predetermined region with a second number of times of scanning smaller than the first number of times of scanning, the liquids are applied to the predetermined region by applying operation performed in a different manner from the application for the first number of times of scanning.

6. The printing apparatus according to claim 5, wherein when the liquids are applied with the second number of times of scanning, the color liquid, the clear liquid, and the reactive liquid are each applied in each time of scanning.

7. The printing apparatus according to claim 1, wherein the reactive component in the reactive liquid is capable of flocculating or gelling the coloring material in the color liquid.

8. The printing apparatus according to claim 1, wherein the reactive component in the reactive liquid is less reactive with the clear liquid than with the color liquid.

9. The printing apparatus according to claim 1, wherein the polymer emulsion in the clear liquid forms a film when being heated.

10. The printing apparatus according to claim 9, further comprising a heating device configured to heat the printing medium onto which a liquid has been applied.

11. The printing apparatus according to claim 1, wherein the liquid absorption of the printing medium until 30 msec$^{1/2}$ has elapsed after a liquid has been applied is less than 10 mL·m$^{-2}$ when measured by Bristow's method.

12. The printing apparatus according to claim 1, wherein the printing medium includes a polyvinyl chloride layer.

13. The printing apparatus according to claim 1, wherein the color liquid further contains a water-soluble resin having an anionic group, and the reactive liquid further contains a water-soluble resin having an anionic group, and
wherein the pKa of the reactive component in the clear liquid is lower than the pKa of the anionic group of the water-soluble resin in the color liquid and higher than the pKa of the anionic group of the water-soluble resin in the reactive liquid.

14. The printing apparatus according to claim 13, wherein the water-soluble resin in the reactive liquid has a sulfo group or a phosphate group.

15. The printing apparatus according to claim 13, wherein the water-soluble resin in the color liquid has a carboxy group.

16. The printing apparatus according to claim 1, wherein the reactive component in the clear liquid is an organic acid.

17. The printing apparatus according to claim 16, wherein the reactive component in the clear liquid is glutaric acid.

18. The printing apparatus according to claim 1, wherein the printing apparatus is operable to apply the liquids onto a plurality of types of printing media including a first printing medium and a second printing medium less permeable to liquid than the first printing medium, and
wherein for the first printing medium, the color liquid is applied to a predetermined region of the first printing medium without using the clear liquid nor the reactive liquid by applying operation performed in a different manner from the first, the second, and the third applying operation, and for the second printing medium, the color liquid, the clear liquid, and the reactive liquid are applied to a predetermined region of the second printing medium by performing the first applying operation, the second applying operation, and the third applying operation in this order.

19. The printing apparatus according to claim 18, wherein the first printing medium is one of plain paper and glossy paper, and the second printing medium includes a polyvinyl chloride layer.

20. The printing apparatus according to claim 1, wherein an amount of coloring material in the clear liquid is substantially zero.

21. The printing apparatus according to claim 1, wherein the clear liquid does not contain a coloring material.

22. The printing apparatus according to claim 1, wherein an amount of coloring material in the reactive liquid is substantially zero.

23. The printing apparatus according to claim 1, wherein the reactive liquid does not contain a coloring material.

24. A method for applying a color liquid, a clear liquid, and a reactive liquid onto a printing medium, the color liquid containing a coloring material, a clear liquid containing a polymer emulsion but no coloring material, and a reactive liquid containing a reactive component reactive with the color liquid but containing no coloring material, the method comprising:
selectively applying the liquids to a predetermined region of the printing medium, the selectively applying the liquids including performing applying operations in the following order:
a first applying operation of applying the clear liquid and the reactive liquid each in a larger amount than the color liquid;
a second applying operation of applying the color liquid in a larger amount than each of the clear liquid and the reactive liquid; and
a third applying operation of applying the clear liquid in a larger amount than each of the color liquid and the reactive liquid.

* * * * *